(12) United States Patent
Konar et al.

(10) Patent No.: US 7,395,515 B2
(45) Date of Patent: Jul. 1, 2008

(54) METHOD AND APPARATUS FOR SCREEN OBJECT MANIPULATION

(75) Inventors: Murat N. Konar, San Francisco, CA (US); Josh Rosen, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 512 days.

(21) Appl. No.: 11/077,822

(22) Filed: Mar. 10, 2005

(65) Prior Publication Data

US 2005/0160380 A1 Jul. 21, 2005

Related U.S. Application Data

(63) Continuation of application No. 10/021,889, filed on Dec. 12, 2001, now Pat. No. 6,989,847, and a continuation of application No. 09/004,233, filed on Jan. 8, 1998, now Pat. No. 6,088,027, and a continuation of application No. 09/584,836, filed on May 31, 2000, now Pat. No. 6,337,703.

(51) Int. Cl.
*G06F 3/00* (2006.01)

(52) U.S. Cl. .................. 715/858; 715/790; 345/662

(58) Field of Classification Search ............... 715/858, 715/790; 345/662
See application file for complete search history.

(56) References Cited

U.S. PATENT DOCUMENTS

| | | | | |
|---|---|---|---|---|
| 4,698,625 A | * | 10/1987 | McCaskill et al. | 345/157 |
| 5,463,722 A | * | 10/1995 | Venolia | 345/662 |
| 5,490,241 A | * | 2/1996 | Mallgren et al. | 345/440 |
| 5,801,699 A | * | 9/1998 | Hocker et al. | 715/837 |
| 6,088,027 A | * | 7/2000 | Konar et al. | 715/858 |
| 6,232,983 B1 | * | 5/2001 | Felser et al. | 345/649 |

* cited by examiner

*Primary Examiner*—Sy D. Luu
(74) *Attorney, Agent, or Firm*—Robert C. Kowert; Meyertons, Hood, Kivlin, Kowert & Goetzel, P.C.

(57) ABSTRACT

The present invention comprises a method and apparatus for manipulating screen objects utilizing multiband regions of influence. Positioning a reference point of an object within a particular band invokes a particular functionality or operation related to that band. In one embodiment, three types of functionality are provided. Moving a reference datum (for example, a line representing an edge or a user defined reference point) of an object A into a first band of an object B places object A under the influence of object B's gravity, causing object A to be pulled into precise alignment with object B. Moving the reference point of object A from the first band into a second band turns off object B's gravity, allowing object A to be freely moved to any arbitrary position near the object B. Moving the reference point of the object A to a position outside all bands causes object B's gravity function to be turned back on. In other embodiments, the bands of the invention provide other kinds of functionalities or operations. For example, one embodiment comprises bands that provide different types of precise positioning. In one embodiment, multiple bands are provided, each one causing objects to be positioned so as to be spaced apart by one of several precise, predetermined distances.

15 Claims, 18 Drawing Sheets

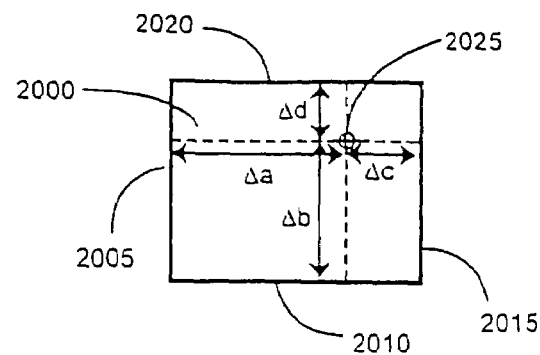
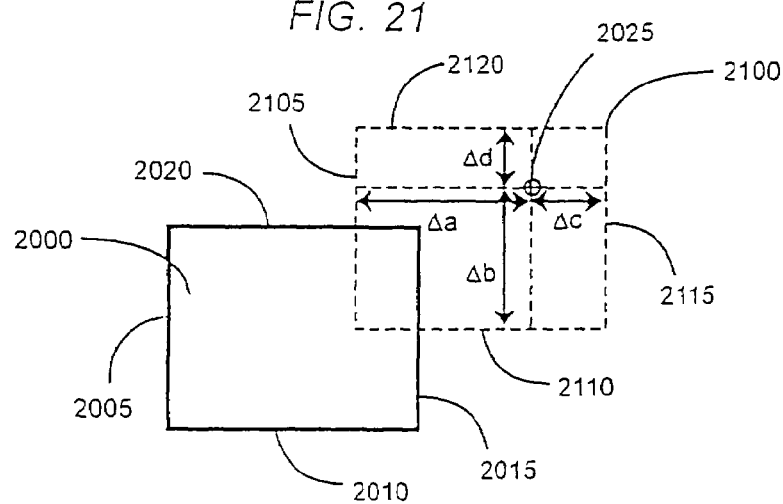
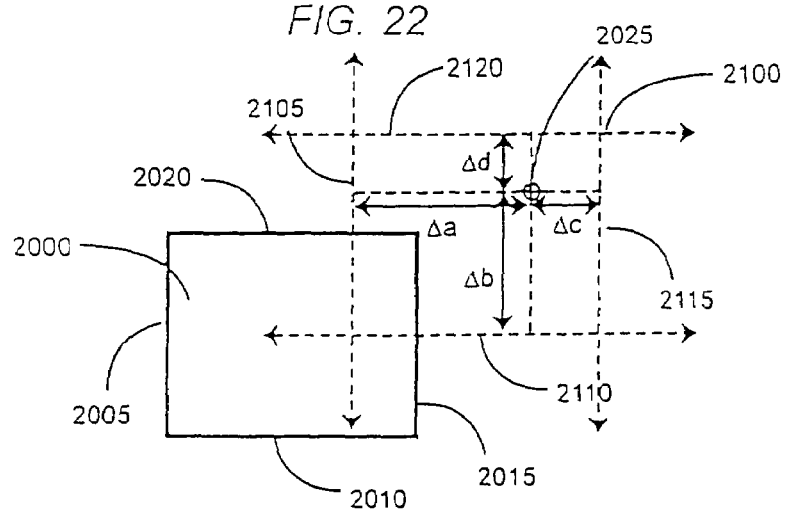

METHOD AND APPARATUS FOR SCREEN OBJECT MANIPULATION

CROSS REFERENCE TO RELATED APPLICATIONS

This application is a continuation of 10/021,889 filed Dec. 12, 2001 (now U.S. Pat. No. 6,989,847 issued Jan. 24, 2006), a continuation of 09/004,233 filed Jan. 8, 1998 (now U.S. Pat. No. 6,088,027 issued Jul. 11, 2000), and a continuation of 09/584,836 filed May 31, 2000 (now U.S. Pat. No. 6,337,703 B1 issued Jan. 8, 2002).

BACKGROUND OF THE INVENTION

1. Field of the Invention

The present invention relates to the manipulation of objects displayed on a display screen, and more particularly to a method and apparatus for positioning objects using direct manipulation.

2. Background Art

FIG. 1 shows an example of two objects, object A 100 and object B 105, displayed on a display device such as a computer display screen. The objects may, for example, be objects created with a graphics editing program. Objects such as object A 100 and object B 105 that are displayed on a display screen may be referred to as "screen objects." The screen objects shown in FIG. 1 are simple rectangles. However, screen objects can have any size and shape. Further, a screen object may consist of a group of different objects. For example, a screen object may comprise a bit-mapped image combined with a vector-based drawing object. A screen object may also represent other objects or data, such as, for example, a sound clip or video data.

A user often desires to manipulate screen objects such that they are precisely located or precisely dimensioned with respect to other objects on the screen. For example, a user may desire to position an object such that one or more of its edges coincide with one or more edges of another object, as shown in FIG. 2, or such that one or more of its edges are positioned close to but spaced apart from another object, as shown in FIG. 3. A user may also wish to resize an object such that the object has the same height and/or width as another object, as shown in FIG. 4.

A number of approaches to the precision location and precision sizing of screen objects have been developed in the prior art.

One approach, used in drawing programs such as MacDraw (tm) and Claris Works (tm), is to provide precision-location and precision-sizing commands. To use these commands, a user must first select the objects in question, for example by positioning a cursor over each object and clicking a mouse button. Next, the user must invoke the desired command, for example by hitting an appropriate hot key or key combination on a keyboard or by selecting the command using pull-down menus. Finally, the user must enter information regarding the manner in which the user wants to position or resize the object into a dialog box that opens after the command is activated. FIG. 5 shows an example dialog box for the "align" menu command from MacDraw(tm).

Although using precision location and precision sizing commands allows the user to position or size objects, the multiple steps required to use these commands are inconvenient.

A second approach uses a technique sometimes referred to as "gravity." In this approach an object, around its edges, is provided with a "region of influence" that exerts a pull on other objects that come into the region. FIGS. 6-9 illustrate the operation of the prior art gravity technique. In FIG. 6, a dotted rectangle 600 indicates the region of influence for the left edge of object B 105. FIG. 6 also shows a mouse cursor 605 positioned over object A 100. A user may move object A 100 by selecting and "dragging" object A 100 with a mouse.

In the gravity approach, when a first object (such as object A 100) is dragged so that one of its edges enters the region of influence of an edge of a second object (such as object B 105), the first object is automatically "snapped" to the second object such that the edges of the two objects meet. FIG. 7 shows object A 100 after it has been moved horizontally to the right such that its right edge enters region of influence 600 of object B 105. Once the right edge of object A 100 enters region of influence 600, object A 100 is snapped to the right such that its right edge is aligned with the left edge of object B 105, as shown in FIG. 8. In this prior art example, if mouse cursor 605 is dragged far enough further to the right, object A 100 once again becomes "unstuck" from object B 105, as shown in FIG. 9.

Although the gravity technique of the prior art is useful when a user wants to align objects such that their edges coincide, it prevents the user from arbitrarily positioning objects close to one another. As soon as an edge of a first object enters a second object's region of influence, the first object is snapped into alignment with the second object. Prior art gravity systems thus provide for easy alignment, but at the cost of preventing arbitrary positioning of objects close to one another.

SUMMARY OF THE INVENTION

The present invention comprises a method and apparatus for manipulating screen objects utilizing multiband regions of influence. Positioning a reference datum of an object within a particular band invokes a particular functionality or operation related to that band and to that datum.

In one embodiment, three types of functionality are provided. Moving a reference point or datum (for example, a line representing an edge or a user-defined reference point) of an object A into a first band of an object B places object A under the influence of object B's gravity, causing object A to be pulled into precise alignment with object B. Moving the reference point of object A from the first band into a second band turns off object B's gravity, allowing object A to be freely moved to any arbitrary position near the object B. Moving the reference point of the object A to a position outside all bands causes object B's gravity function to be turned back on. By providing multiple bands of functionality, this embodiment allows a user to conveniently select among precise positioning (or sizing) provided by gravity and arbitrary positioning (or sizing) allowed by an absence of gravity, simply by dragging an object's reference point into an appropriate band. No menu commands are required.

In other embodiments, the bands of the invention provide other kinds of functionalities or operations. For example, one embodiment comprises bands that provide different types of precise positioning. In one embodiment, multiple bands are provided, each one causing objects to be positioned so as to be spaced apart by one of several precise, predetermined distances.

BRIEF DESCRIPTION OF THE DRAWINGS

FIG. 20 shows how datum lines for an object being moved are determined in one embodiment of the invention.

FIG. 21 shows how datum lines for an object being moved are determined in one embodiment of the invention.

FIG. 22 shows how datum lines for an object being moved are determined in one embodiment of the invention.

DETAILED DESCRIPTION OF THE INVENTION

A method and apparatus for manipulation of screen objects is described. In the following description, numerous specific details are set forth in order to provide a more thorough description of the invention. It will be apparent, however, to one skilled in the art, that the invention may be practiced without these specific details. In other instances, well-known features have not been described in detail so as not to obscure the invention.

Figure 1:
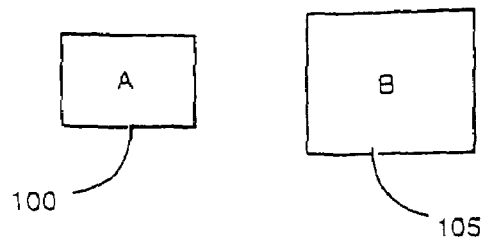
FIG. 1 shows a first arrangement of two example screen objects.
Figure 2:
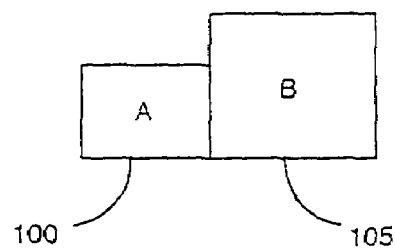
FIG. 2 shows a second arrangement of the screen objects of FIG. 1.
Figure 3:
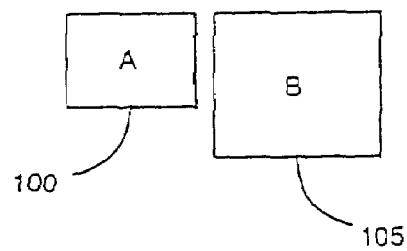
FIG. 3 shows a third arrangement of the screen objects of FIG. 1.
Figure 4:
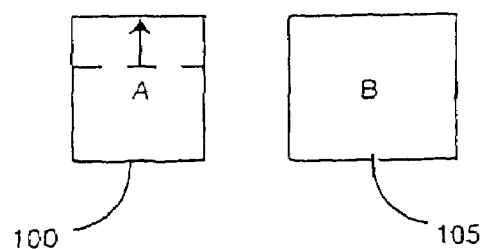
FIG. 4 shows a fourth arrangement of the screen objects of FIG. 1.
Figure 5:
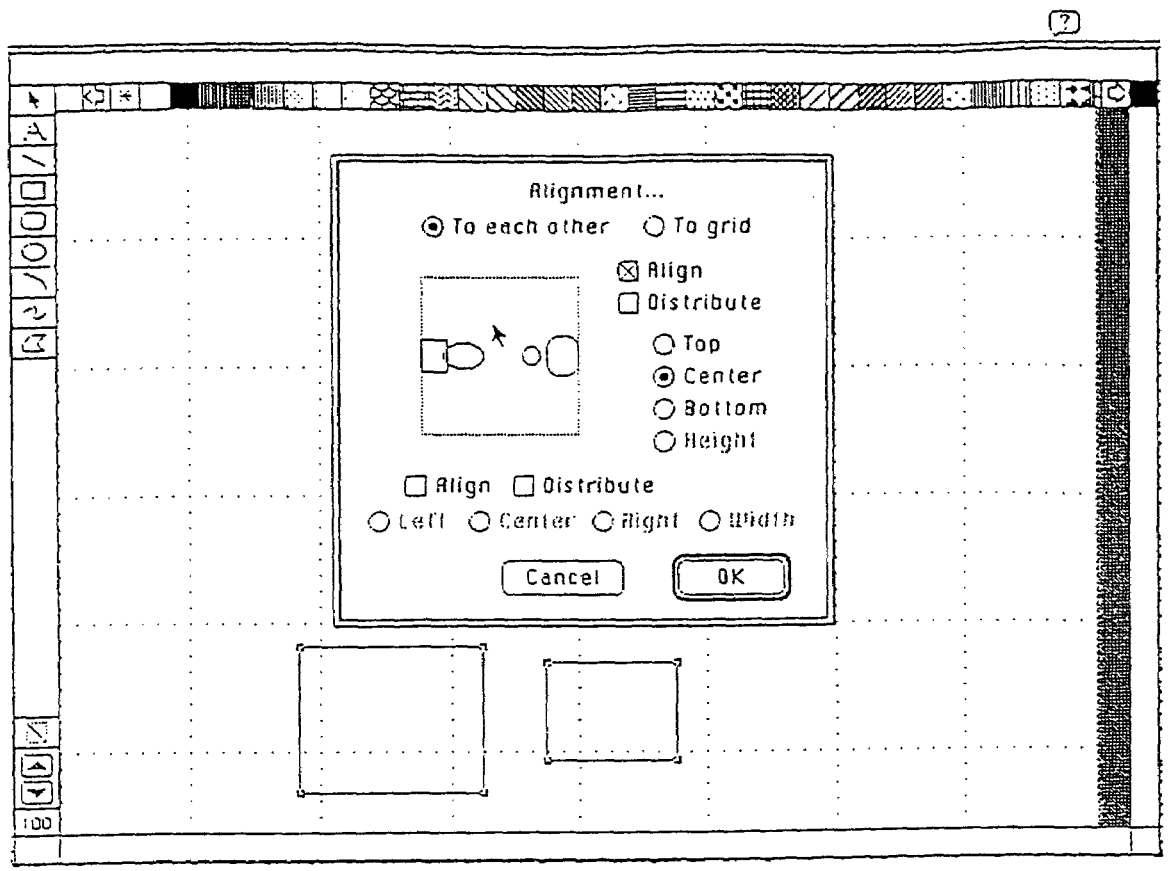
FIG. 5 shows a dialog box of an alignment command of the prior art.
Figure 6:
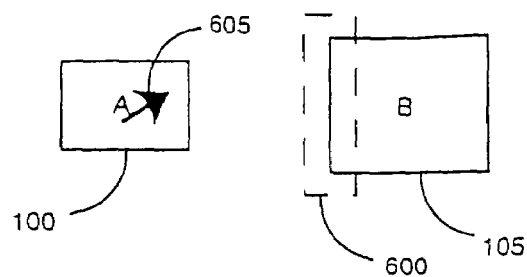
FIG. 6 shows an example of a region of influence of the prior art.
Figure 7:
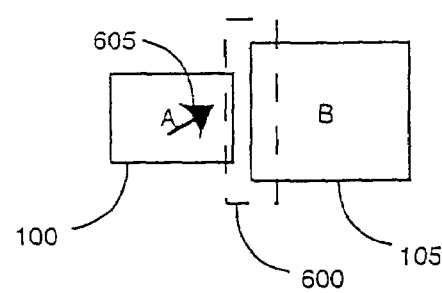
FIG. 7 shows the operation of the region of influence of FIG. 6.
Figure 8:
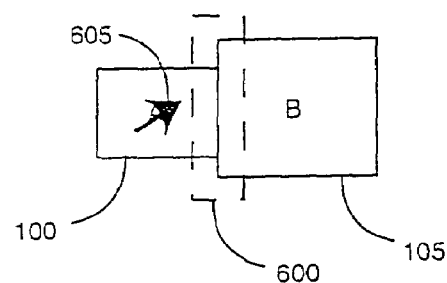
FIG. 8 shows the operation of the region of influence of FIG. 6.
Figure 9:
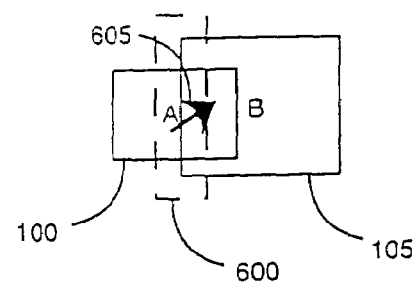
FIG. 9 shows the operation of the region of influence of FIG. 6.
Figure 10:
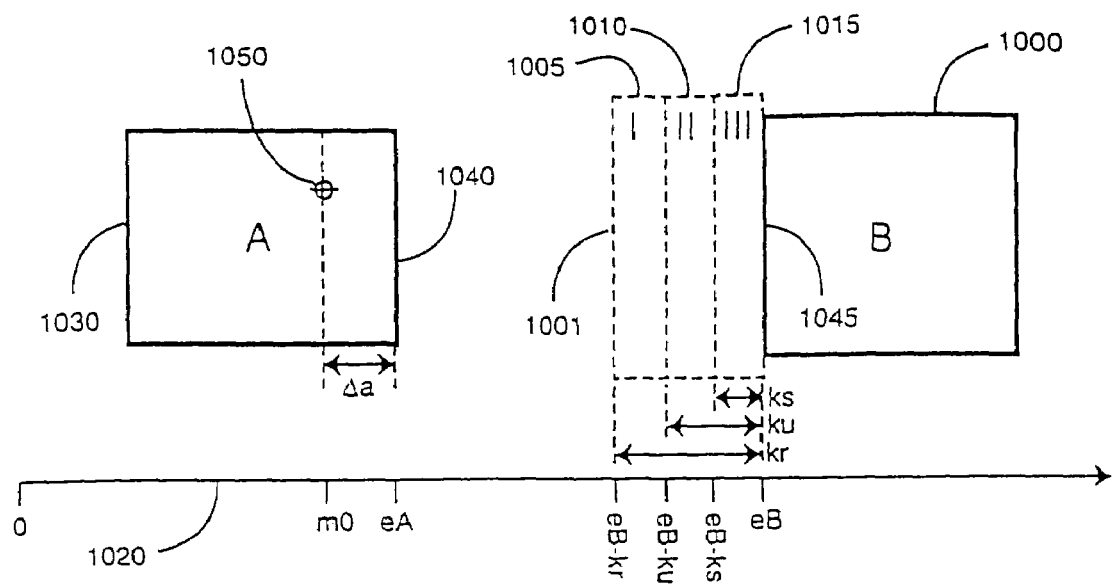
FIG. 10 shows an embodiment of a multiband region of influence of the invention.

FIG. 10 shows an example embodiment of a multiband region of influence of the invention. In FIG. 10, a multiband region of influence 1001 comprising bands 1005, 1010 and 1015 is shown extending outwards adjacent to left edge 1045 of a first screen object B 1000. Dotted lines are used to show multiband region of influence 1001 in FIG. 10 to indicate that multiband region of influence 1001 is not normally displayed to a user. FIG. 10 also shows a second screen object A 1030 located to the left of object B 1000, and a horizontal coordinate axis 1020. Coordinate axis 1020 is provided to indicate relative horizontal positions. For example, the right edge 1040 of object A 1030 is located at coordinate "eA" on axis 1020, while the left edge 1045 of object B 1000 is located at coordinate "eB." For the example of FIG. 10, object A 1030 is initially constrained to move horizontally only. However, no such constraints are necessary to practice the invention.

In the example of FIG. 10, multiband region of influence is associated with an edge, namely left edge 1045, of object B 1000. However, in other embodiments, the multiband region of influence of the invention may be associated with other reference points of a screen object, including user defined reference points.

In the example of FIG. 10, multiband region of influence 1001 comprises three bands 1005, 1010 and 1015, respectively. As shown in FIG. 10, band 1015 extends outwards a distance ks from left edge 1045 of object B 1000. The right edge of band 1015 is thus located at coordinate "eB" on coordinate axis 1020, while the left edge of band 1015 is located at coordinate "eB-ks." Band 1010 extends from the left edge of band 1015 at coordinate "eB-ks" to coordinate "eB-ku." Band 1005 extends from the left edge of band 1010 at coordinate "eb–ku" to coordinate "eB–kr."

In the example of FIG. 10, object A 1030 is to be moved adjacent to object B 1000, for example by "drag and dropping" with a mouse. To drag and drop object A, a mouse is used to position a cursor 1050 over object A 1030. A mouse button is then depressed, locking the cursor onto object A 1030 at the spot at which the mouse button was depressed. The cursor is then moved to a new location, "dragging" object A with it. At the new location, the mouse button is released, thereby "dropping" object A 1030 at the new location.

The process of dragging and dropping an object may be displayed to a user in a number of ways, depending on the embodiment of the user interface being used. In certain embodiments, the object is shown to move with the cursor in real time. In other embodiments, the object remains in place, and an outline representing the object moves with the cursor to indicate the object's new location. For the process of the invention, any representation of drag-and-dropping may be used.

In one embodiment, a reference datum representing the position of one or more edges of an object being moved with respect to a cursor location is used to determine whether the functionality associated with a multiband region of influence is to be invoked. In other embodiments, other and/or additional reference datums may be used. In one embodiment, the user may define reference datums for a screen object. Different functionalities may be associated with different datums, or with different ways of selecting a datum. For example, selecting a datum by clicking a left mouse button may invoke a different functionality, when the datum is moved inside a region of influence, than selecting the datum by clicking a right mouse button. In one embodiment, for an object having multiple reference datums, the datum closest to the cursor position when the mouse button is clicked is deemed to be the active datum whose position relative to a region of influence invokes the functionality associated with the region.

In FIG. 10, at the time the mouse button is depressed, cursor 1050 is located on object A 1030 at coordinate "m0" on horizontal coordinate axis 1020. Since the right edge 1040 of object A 1030 is located at coordinate "eA," the horizontal distance of right edge 1040 from cursor 1050 at this time is Δa=eA−m0. Right edge 1040 of object A 1030 is thus located a distance Δa to the right of cursor 1050.

Figure 11:
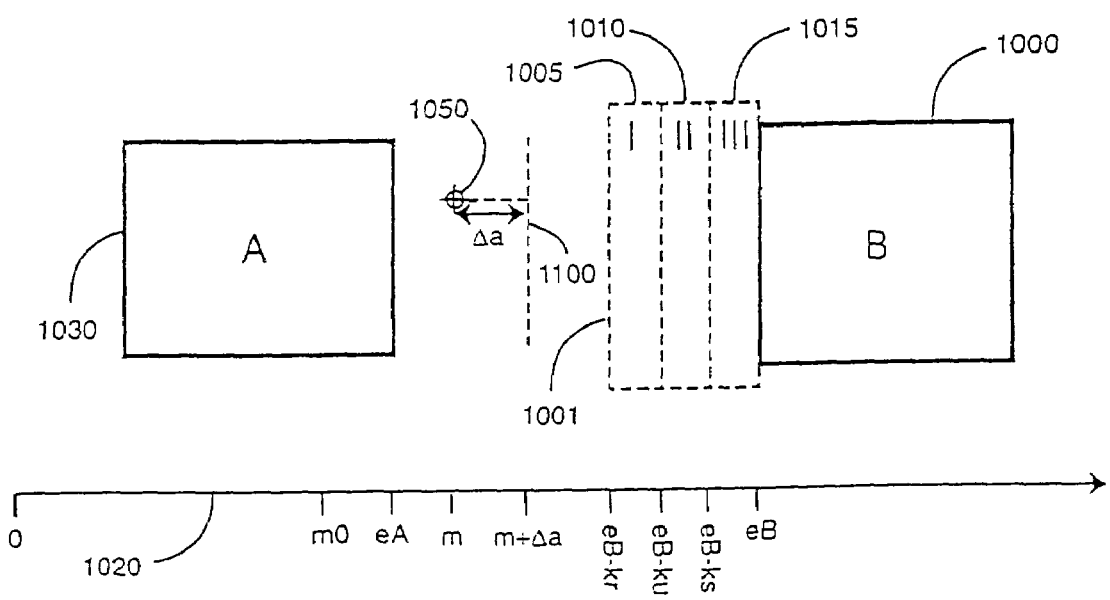
FIG. 11 shows an example of a reference datum for an object being moved in one embodiment of the invention.

FIG. 11 shows mouse cursor 1050 after it has moved horizontally to the right from its position at coordinate "m0" in FIG. 10 to coordinate "m" on coordinate axis 1020. Reference datum 1100 represents a reference datum for right edge 1040 of object A 1030. Since right edge 1040 of object A 1030 was located a distance Δa to the right of cursor 1050 when the mouse button was depressed, reference datum line 1100 is defined to be located at horizontal coordinate "m+Δa" when the mouse cursor is positioned at horizontal coordinate "m."

Figure 12:
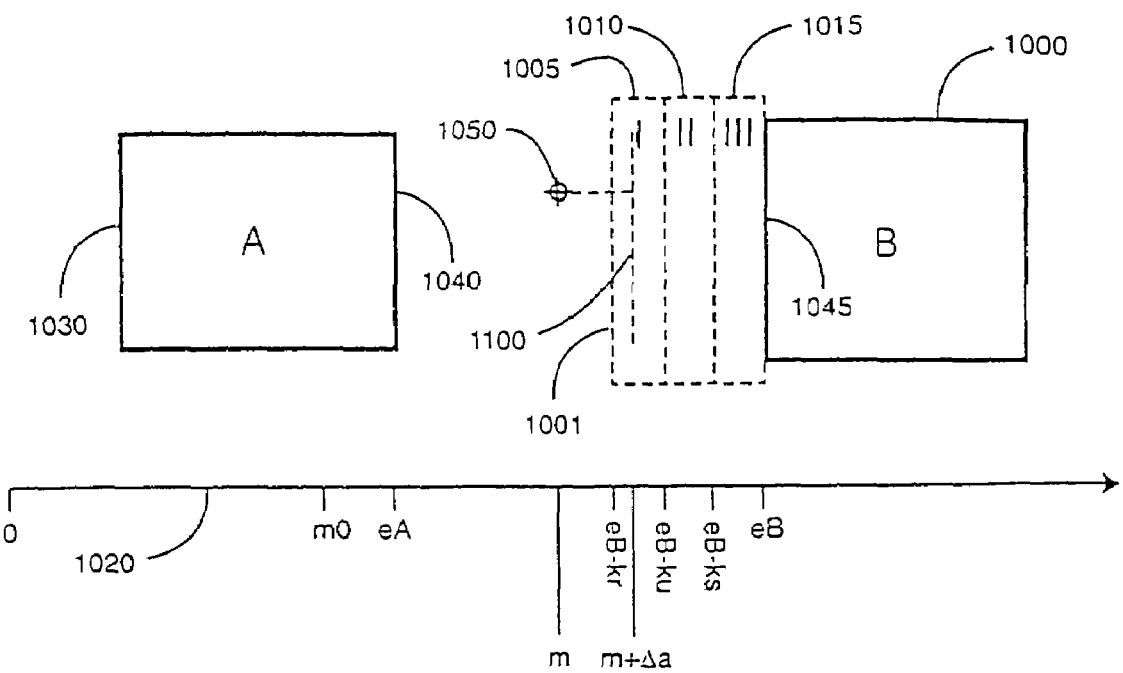
FIG. 12 shows the operation of the multiband region of influence of FIG. 10.
Figure 13:
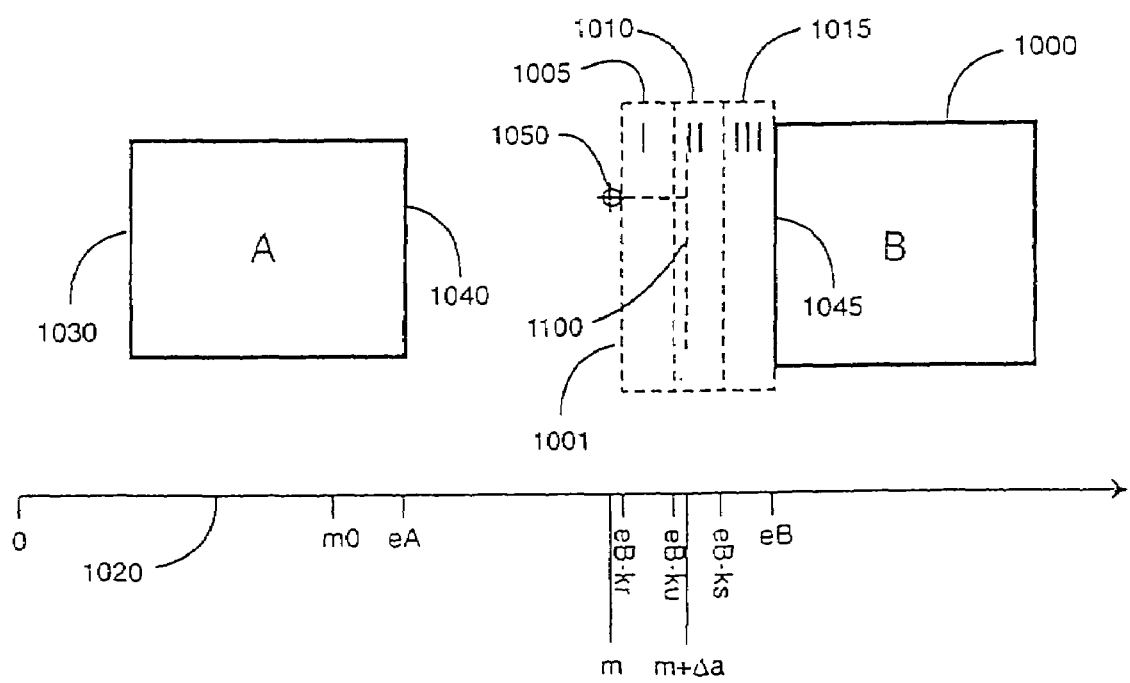
FIG. 13 shows the operation of the multiband region of influence of FIG. 10.
Figure 14:
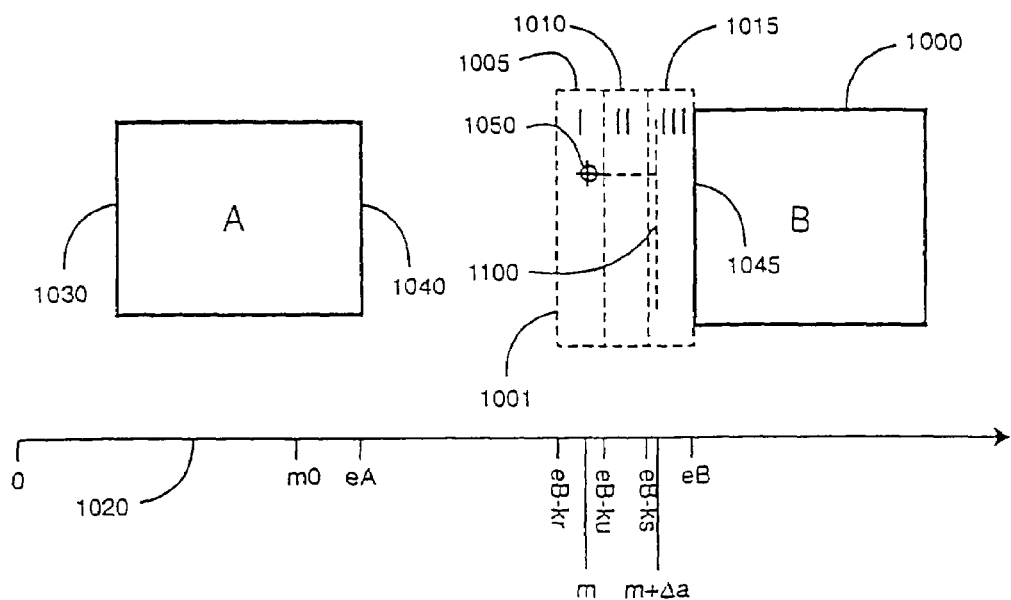
FIG. 14 shows the operation of the multiband region of influence of FIG. 10.

As mouse cursor 1050 is moved, the value of its horizontal coordinate "m" is monitored. Using this value, the coordinate "m+Δa" for reference datum line 1100 is calculated. The value of coordinate "m+Δa" is compared to the coordinates of the edges of bands 1005, 1010 and 1015 of region of influence 1001 to determine whether any functionality related to region of influence 1001 is to be applied. FIGS. 12, 13 and 14 illustrate how reference datum line 1100 falls successively into bands 1005, 1010, and 1015 of multiband region of influence 1001 as cursor 1050 is moved to the right. As shown in FIG. 12, reference datum line 1100 falls into band 1005 when (eB−kr)<(m+Δa)<(eB−ku). As shown in FIG. 13, reference datum line 1100 falls into band 1010 when (eB−ku)<(m+Δa)<(eB−ks). And as shown in FIG. 14, reference datum line 1100 falls into band 1015 when (eB−ks)<(m+Δa)<eB.

The bands of the region of influence of the invention can have a variety of configurations. Bands may be contiguous as in the embodiment of FIG. 10. Alternatively, they may overlap, be separated, or be arranged in some other manner. Bands may be associated with one or more external boundaries of an object, and/or with one or more other external or internal points or features of an object. For example, in one embodiment that allows a user to establish multiple user-defined reference datums for an object, bands of influence may be associated with each of the user-defined reference datums.

The multiband regions of influence of the invention can be used to invoke a variety of functionalities, depending on the embodiment. In one or more embodiments, the particular functionality invoked may depend not only on the location of a reference datum, but also on the identity and type of the datum, on the type of operation being performed (e.g. moving, resizing, etc.), on the direction of datum line movement, on whether the right or left mouse button has been clicked or a keyboard key has been depressed, on the states of objects being manipulated, and/or on other criteria. The functionality invoked by a region of influence of the invention may apply an action to an object or objects, may invoke a change of an object or objects from one state to another, or may apply some other function or action.

Figure 15:
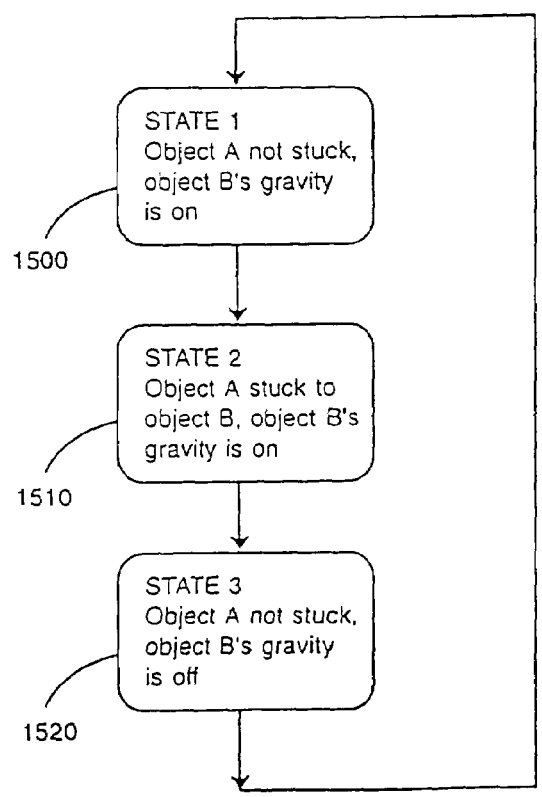
FIG. 15 shows a state transition model for one embodiment of the invention.

For example, in one embodiment, as shown in FIG. 15, there are three possible states when one object ("object A") is being dragged with respect to another object ("object B"). In state 1 1500, object B's "gravity" is turned on. However, object A is located outside of object B's region of influence and is therefore freely movable (not stuck to object B). In state 2 1510, object A, under the influence of object B's gravity, has become stuck to object B. In state 3, object B's gravity has been turned off, and object A, accordingly, is not stuck to object B and is freely movable even within object B's region of influence.

In the state model of FIG. 15, there are three possible state transitions: (i) from state 1 to state 2 (object A falls within pull of object B's gravity and becomes stuck to object B); (ii) from state 2 to state 3 (object B's gravity is turned off, allowing object A to move freely in vicinity of object B); and (iii) from state 3 to state 1 (object B's gravity is turned back on, object A being outside object B's region of influence).

The state transitions of the embodiment of FIG. 15 may be associated with the multiband regions of influence of the invention in a variety of ways. The state transitions of the embodiment of FIG. 15 may, for example, be associated with bands 1005, 1010 and 1015 of FIG. 14.

In one embodiment, the associations between the state transitions and bands 1005, 1010 and 1015 are as follows:

1. When reference datum line 1100 of object A 1030 is outside object B 1000's region of influence 1001 (i.e. datum line 1100 is not in any of bands 1005, 1010 or 1015), as shown in FIG. 11, object A is in state 1. In state 1, eA=m+Δa.
2. A transition from state 1 to state 2 occurs in band 1015, the band closest to object B 1000. Object A 1030 thus stays in state 1 until cursor 1050, as shown in FIG. 14, is moved such that datum line 1100 enters band 1015 (i.e. (m+Δa)>eB−ks). At this point, object A 1030 transitions to state 2, becoming stuck to object B 1000 such that right edge 1040 of object A 1030 coincides with left edge 1045 of object B 1000. In state 2, therefore, eA=eB.
3. A transition from state 2 to state 3 occurs in band 1005. To turn off object B 1000's gravity such that object A 1030 becomes unstuck and freely positionable near object B 1000, cursor 1050 must be moved such that datum line 1100 enters band 1005. Once the transition from state 2 to state 3 has occurred, datum line 1100 can be moved back into band 1015 without object A 1030 becoming stuck to object B 1000.
4. A transition from state 3 back to state 1 occurs beyond the outermost band of region of influence 1001. If object A 1030 is in state 3 (unstuck, object B 1000's gravity off), and it is desired for object A 1030 to be stuck to object B 1000, datum line 1100 must first be moved beyond the outermost band (i.e. band 1005) of region of influence 1001 (to turn object B 1000's gravity back on), and then back inside band 1015 (such that object A 1030 becomes stuck to object B 1000 under the influence of object B 1000's gravity).

In this embodiment, no state transitions or other functionality is associated with band 1010. Accordingly, the same functionality can be provided by the multiband region of influence 1600 of FIG. 16, which includes two bands 1605 and 1610 spaced apart by a distance of ku−ks.

Figure 16:
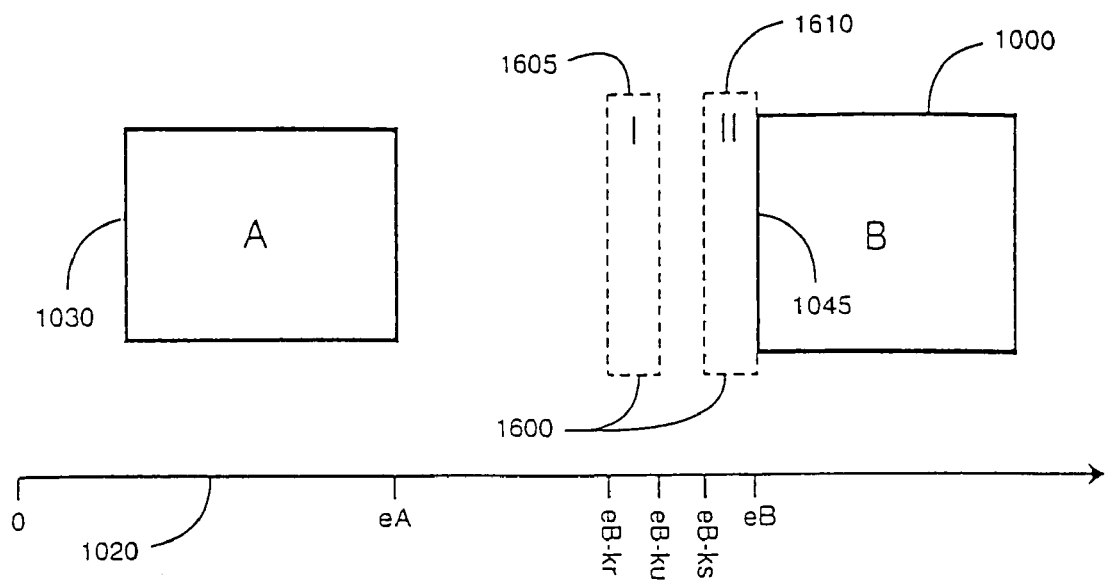
FIG. 16 shows an embodiment of a multiband region of influence of the invention.
Figure 17:
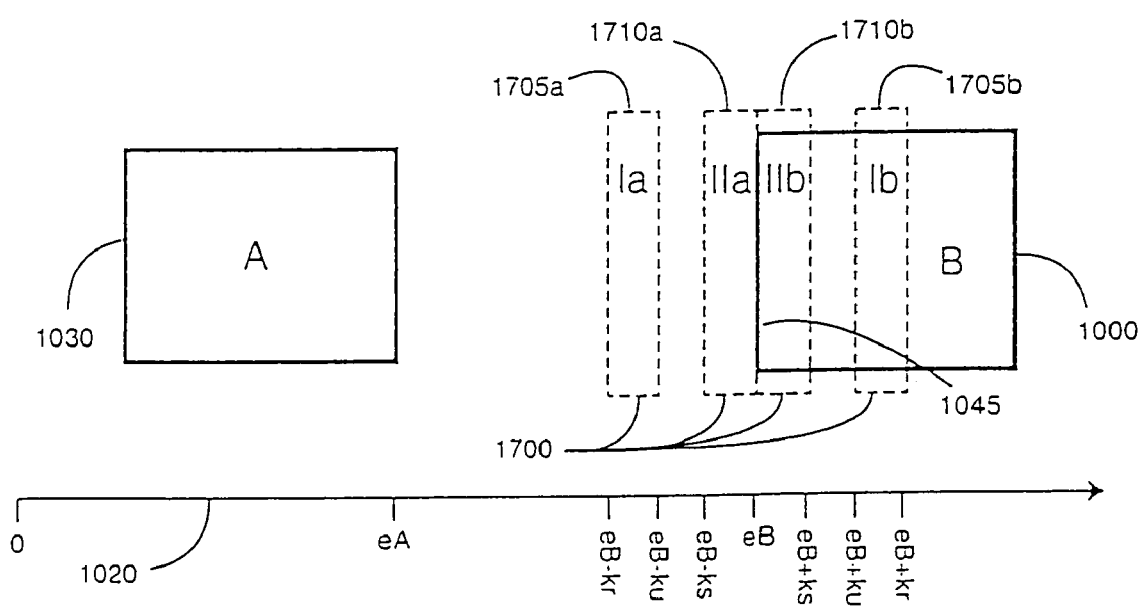
FIG. 17 shows an embodiment of a multiband region of influence of the invention.
Figure 18:
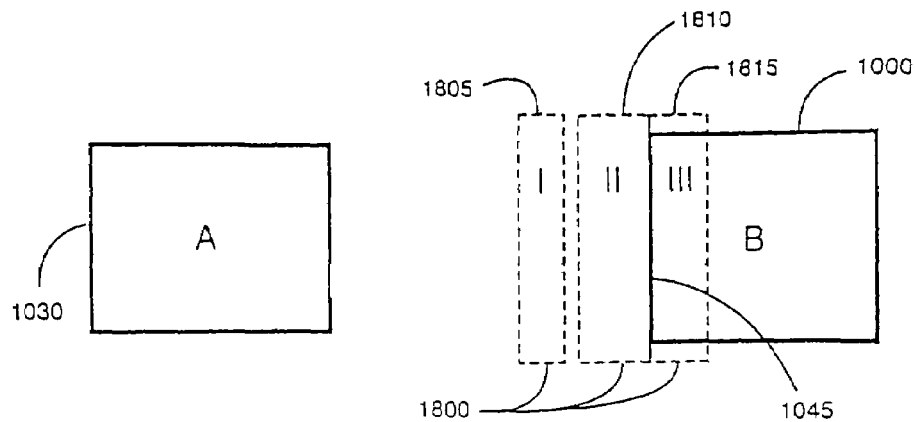
FIG. 18 shows an embodiment of a multiband region of influence of the invention.
Figure 19:
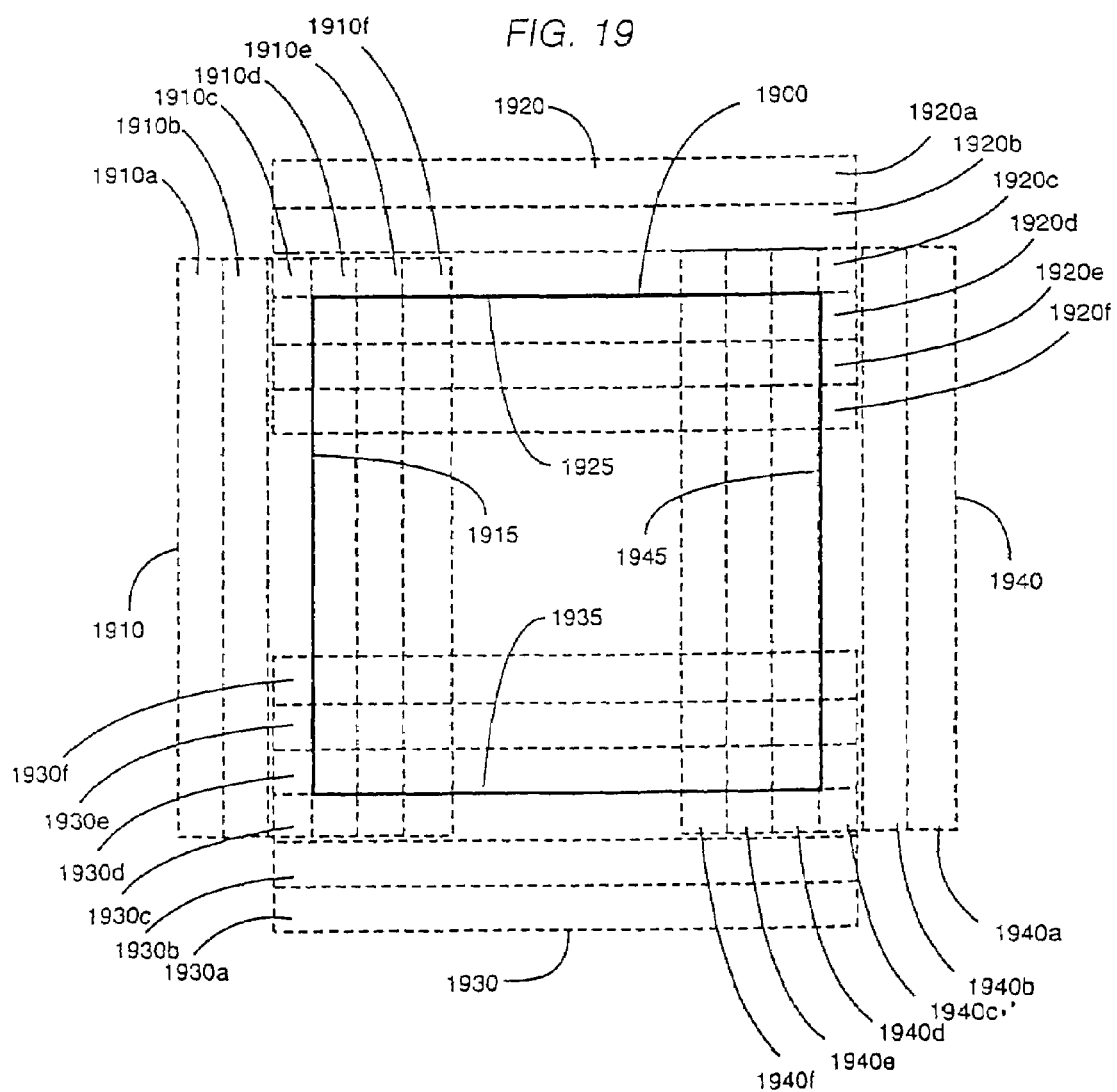
FIG. 19 shows an embodiment of a multiband region of influence of the invention.

In the embodiments of FIGS. 10 and 16, objects were constrained to move horizontally and a multiband region of influence of the invention was shown to extend outwardly in only one direction from only one edge of a screen object. In the more general case, objects may be moved in any direction, and the multiband region of influence extends to both sides of each edge of a screen object. FIGS. 17-19 show different example configurations of the multiband region of influence of the invention.

In the embodiment of FIG. 17, multiband region of influence 1700, like multiband region of influence 1600 of FIG. 16, comprises two bands 1705a and 1710a extending to the left of left edge 1045 of object B 1000. In addition, multiband region of influence 1700 includes two bands 1710b and 1705b extending to the right of edge 1045. In this embodiment, bands 1710b and 1705b are mirror images of bands 1710a and 1705a, respectively, and have the same associated functionalities.

In the embodiment of FIG. 18, multiband region of influence 1800 consists of two bands 1805 and 1810 to the left of left edge 1045 of object B 1000 and one band 1815 to the right of edge 1045. In this embodiment, each of the bands 1805, 1810 and 1815 may have different associated functionalities. In one embodiment, for example, using the state model of FIG. 15, band 1810 invokes a transition from state 1 1500 to state 2 1510, while band 1815 invokes a transition from state 2 1510 to state 3 1520, and band 1805 invokes a transition from state 3 1520 to state 1 1500.

FIG. 19 shows an object 1900 that has multiband regions of influence 1910, 1920, 1930, and 1940 associated with each of its sides 1915, 1925, 1935 and 1945, respectively. Each multiband region of influence 1910-1940 includes six bands a, b, c, d, e and f. The bands invoke certain specified functionalities on objects whose datum lines enter into one or more of the bands. Objects in the embodiment of FIG. 19 are not constrained to move horizontally or vertically, but can move in any direction. In one embodiment, using the state model of FIG. 15, bands c and d invoke a transition from state 1 1500 to state 2 1510, bands a and f invoke a transition from state 2 to state 3, and the region outside of bands a-f invokes a transition from state 3 to state 1. In this embodiment, bands b and e do not invoke any functionality.

FIGS. 20 and 21 show how datum lines are established for use with multiband regions of influence in one embodiment of the invention. FIG. 20 shows an object 2000 with left edge 2005, bottom edge 2010, right edge 2015, and top edge 2020. The datum lines are established, for example, when a mouse cursor is positioned over an object and a mouse button is pressed and held.

FIG. 20 shows a mouse cursor 2025 after it has been positioned over object 2000 and its mouse button has been pressed. At the moment the mouse button is pressed, the distance of cursor 2025 from each of the edges 2005, 2010, 2015 and 2020 is determined. As shown in FIG. 20, the distances from cursor position 2025 to each of edges 2005, 2010, 2015 and 2020 at the time the mouse button is pressed are Δa, Δb, Δc and Δd, respectively.

Datum lines are established at locations that correspond to the position of edges 2005, 2010, 2015 and 2020 relative to cursor position 2025 at the time the mouse button is pressed, as shown in FIG. 21. FIG. 21 shows cursor 2025 after it has been moved, keeping the mouse button pressed, from its original position in FIG. 20. As shown in FIG. 21, the datum lines for edges 2005, 2010, 2015 and 2020 move along with cursor 2025 as cursor 2025 is dragged to a new position. In FIG. 21, datum line 2105 corresponds to edge 2005, datum line 2110 corresponds to edge 2010, datum line 2115 corresponds to edge 2015, and datum line 2120 corresponds to edge 2020.

In the embodiment FIG. 21, the length of each datum line is the same as the length of the corresponding edge of object 2000. However, in other embodiments, the length of a datum line may be different from the length of the corresponding object edge. For example, in FIG. 22, datum lines 2105, 2110, 2115 and 2120 extend indefinitely.

FIGS. 23-26 demonstrate the interaction of the datum lines of FIG. 21 with the multiband regions of influence of FIG. 19 in one embodiment of the invention. In the embodiment of FIGS. 23-26, the functionality invoked by regions of influence related to vertical edges of objects is invoked only if all or part of a vertical datum line of an object being moved falls into the region, while the functionality invoked by regions of influence related to horizontal edges of objects is invoked only if all or part of a horizontal datum line of an object being moved falls into the region.

Figure 23:
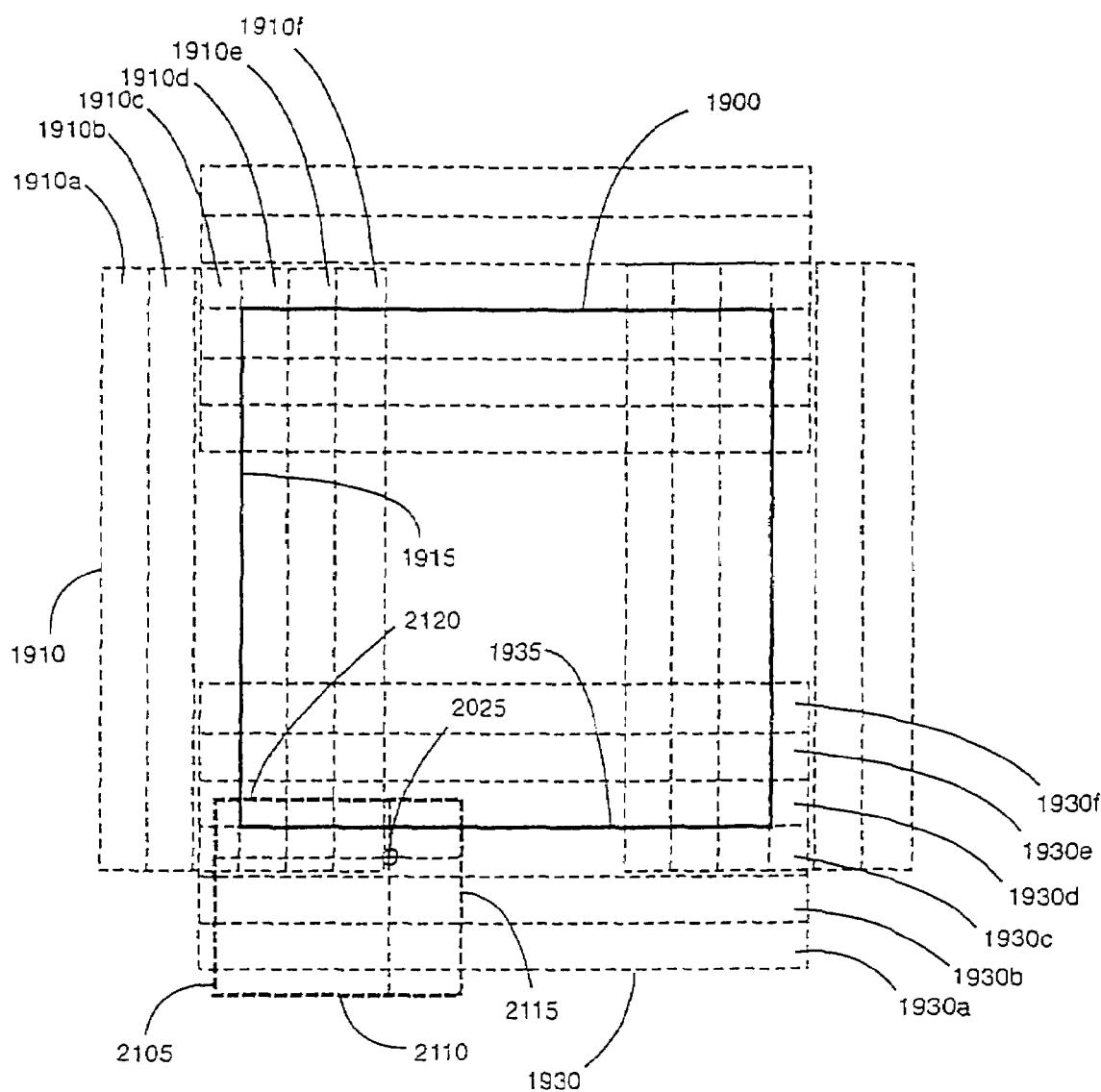
FIG. 23 shows the operation of one embodiment of a multiband region of influence of the invention.

For example, in FIG. 23, cursor 2025, originally positioned on object 2000 as shown in FIG. 20, has been moved, along with the datum lines 2105, 2110, 2115, and 2120 such datum line 2120 (corresponding to top edge 2020 of object 2000) protrudes into band 1930d of multiband region of influence 1930 (relating to bottom edge 1935 of object 1900), and datum line 2105 (corresponding to left edge 2005 of object 2000) protrudes into band 1910c of multiband region of influence 1910 (relating to left edge 1915 of object 1900).

In the embodiment of FIG. 23, using the state model of FIG. 15, bands c and d of each region of influence invoke a transition from state 1 1500 to state 2 1510, bands a and f invoke a transition from state 2 1510 to state 3 1520, and the region outside of bands a-f invokes a transition from state 3 1520 to state 1 1500. In this embodiment, bands b and e do not invoke any functionality. Accordingly, when cursor 2025 of FIG. 20 is located as shown in FIG. 23:

1. Because datum line 2120 protrudes into band 1930d, a change in state from state 1 1500 to state 2 1510 is invoked with respect to bottom edge 1935 of object 1900 and top edge 2020 of object 2000. If the mouse button is released while cursor 2025 is in this position, the top edge 2020 of object 2000 becomes "stuck" (aligned), in a vertical direction, to the bottom edge 1935 of object 1900.
2. Because datum line 2105 protrudes into band 1910c, a change in state from state 1 1500 to state 2 1510 is invoked with respect to left edge 1915 of object 1900 and left edge 2005 of object 2000. If the mouse button is released while cursor 2025 is in this position, left edge 2005 of object 2000 becomes "stuck" (aligned), in a horizontal direction, to the left edge 1915 of object 1900.

Figure 24:
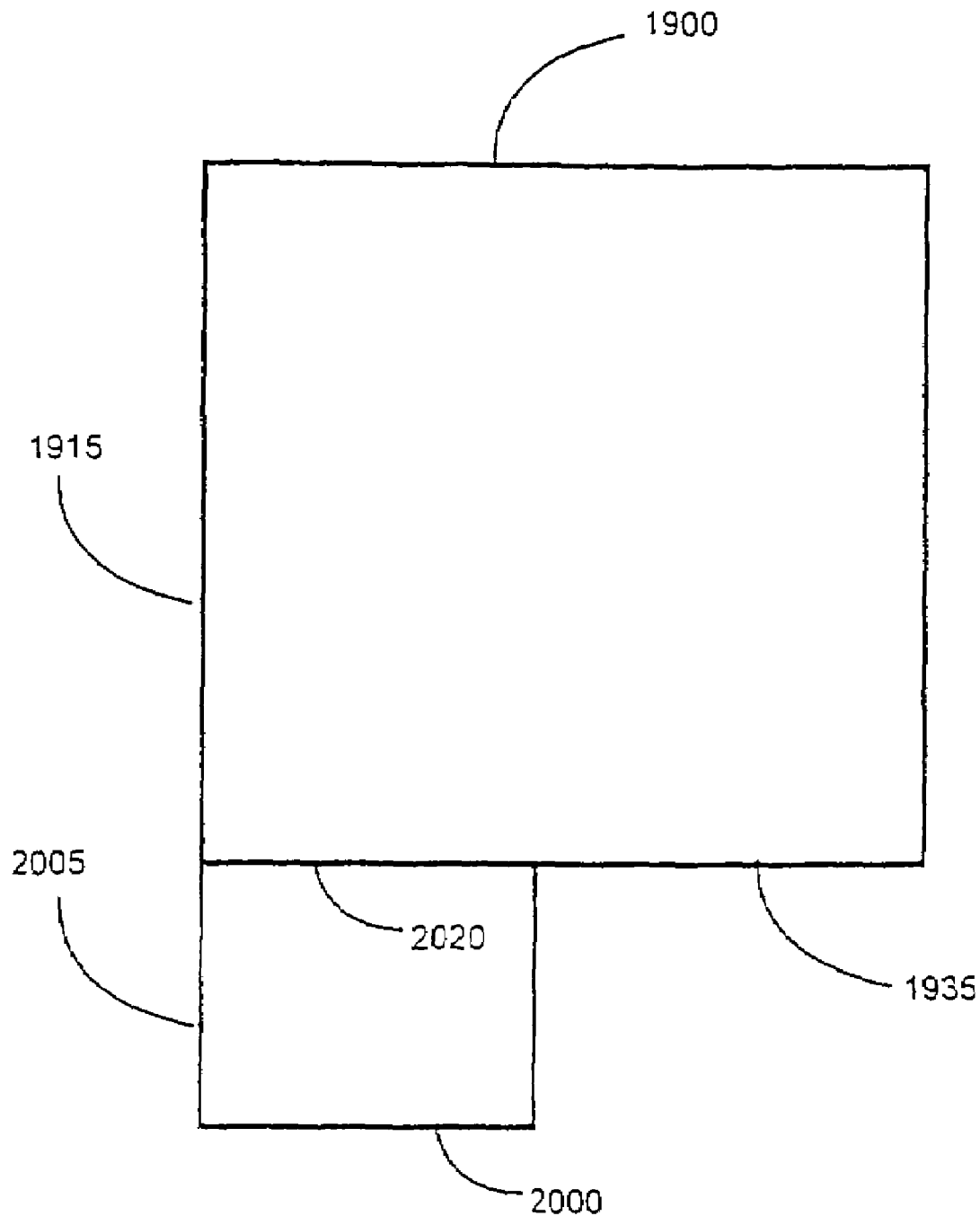
FIG. 24 shows the operation of one embodiment of a multiband region of influence of the invention.
Figure 25:
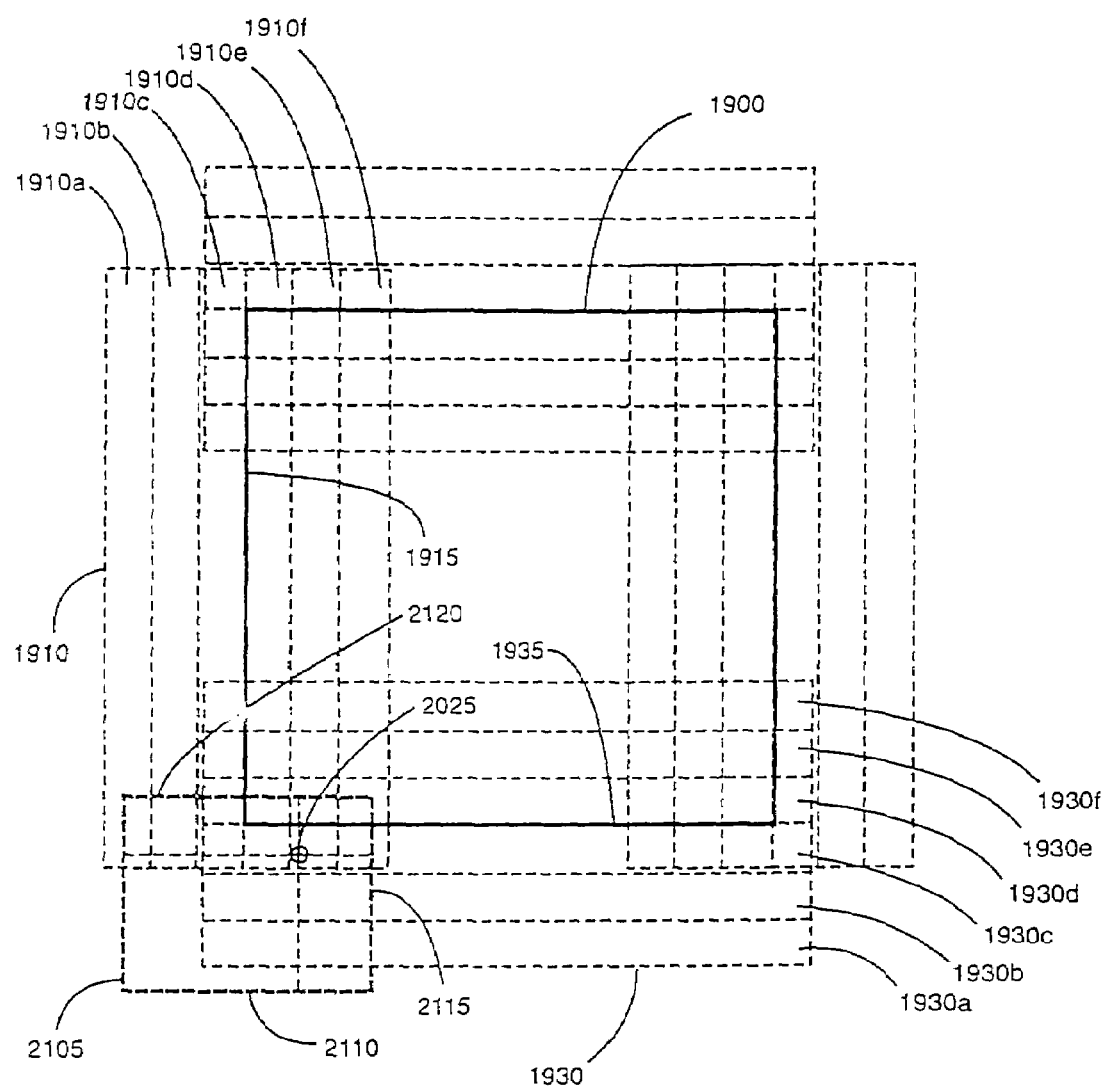
FIG. 25 shows the operation of one embodiment of a multiband region of influence of the invention.

The resulting placement of object 2000 with respect to object 1900 is shown in FIG. 24.

Figure 26:
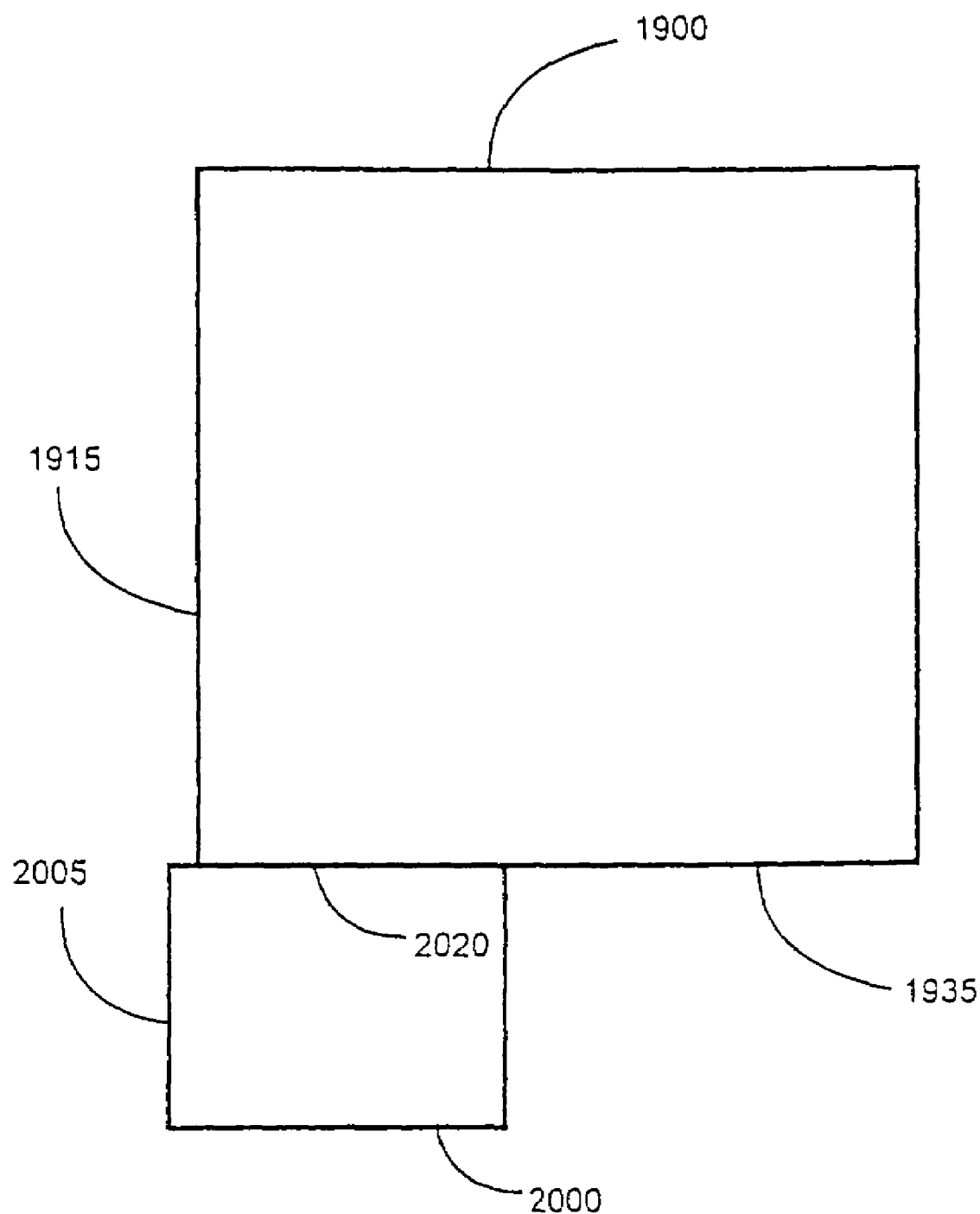
FIG. 26 shows the operation of one embodiment of a multiband region of influence of the invention.

A user may, however, desire to turn off the gravity associated with one or more edges of object 1900 so that one or more edges of object 2000 can be placed close to one or more sides of object 1900 without being stuck to that side. In the embodiment of FIG. 23, gravity with respect to an edge of object 1900 is turned off by moving the appropriate datum line from band c or d into band a or f of the multiband region of influence associated with that edge. For example, to turn off the gravity with respect to left edge 1915 of object 1900, cursor 2025 is moved from the location shown in FIG. 23, at which datum line 2105 extends into band 1910c, to the location shown in FIG. 25, at which datum line 2105 extends into band 1910a, thereby causing the gravity associated with left edge 1915 of object 1900 to be turned off. If cursor 2025 is now moved back to the location shown in FIG. 23, and the mouse button released, top edge 2020 of object 2000 will still be stuck, in a vertical direction, with bottom edge 1935 of object 1900 (because gravity with respect to bottom edge 1935 is still on, and datum line 2120, corresponding to top edge 2020 of object 2000 still extends into band 1930d). However, because gravity associated with left edge 1915 of object 1900 has been turned off, left edge 2005 object 2000 will not become stuck to left edge 1915 of object 1900 even though datum line 2105 extends into band 1910*c*. Instead, left edge 2005 of object 2000 will be located at the same horizontal position as the horizontal position of datum 2105 in FIG. 23. The resulting position of object 2000 with respect to object 1900 is shown in FIG. 26.

Figure 27:
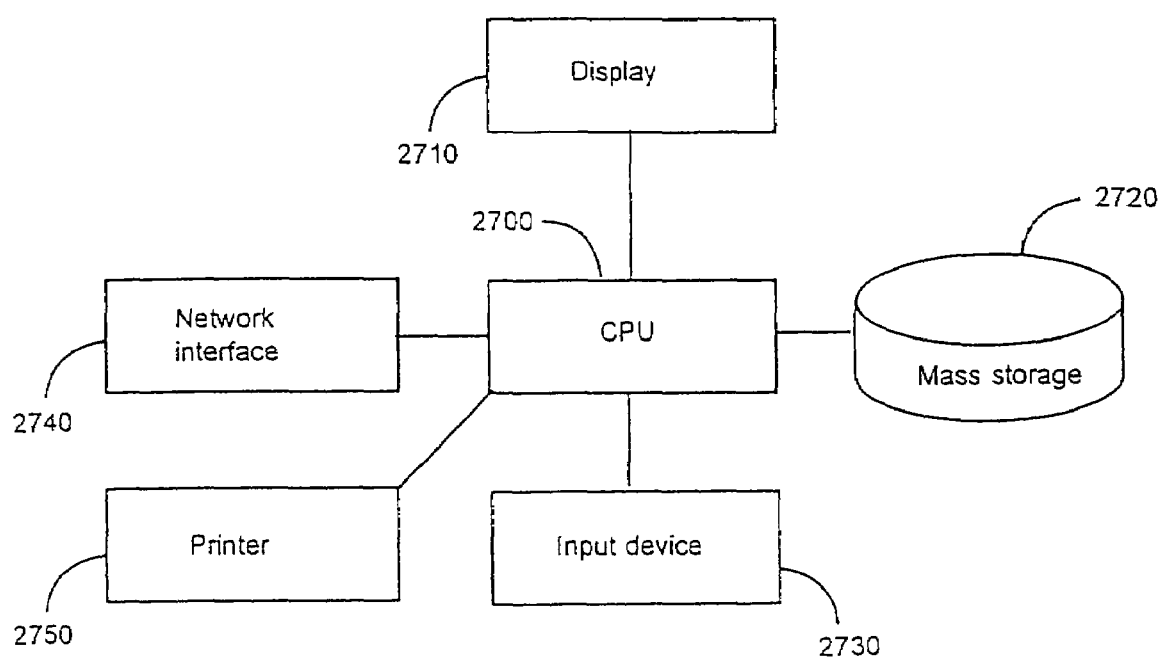
FIG. 27 is an example of one embodiment of a computer system that can be used to implement the invention.

The present invention can be implemented by means of software programming on any of a variety of one or more computer systems as are well known in the art, including, without limitation, computer systems such as that shown in FIG. 27. The computer system shown in FIG. 27 includes a CPU unit 2700 that includes a central processor, main memory, peripheral interfaces, input-output devices, power supply, and associated circuitry and devices; a display device 2710 which may be a cathode ray tube display, LCD display, gas-plasma display, or any other computer display; an input device 2730, which may include a keyboard, mouse, digitizer, or other input device. The computer system may or may not include non-volatile storage 2720, which may include magnetic, optical, or other mass storage devices, and a printer 2750. The computer system may also include a network interface 2740, which may consist of a modem, allowing the computer system to communicate with other systems over a communications network such as the Internet. Any of a variety of other configurations of computer systems may also be used.

Figure 28:
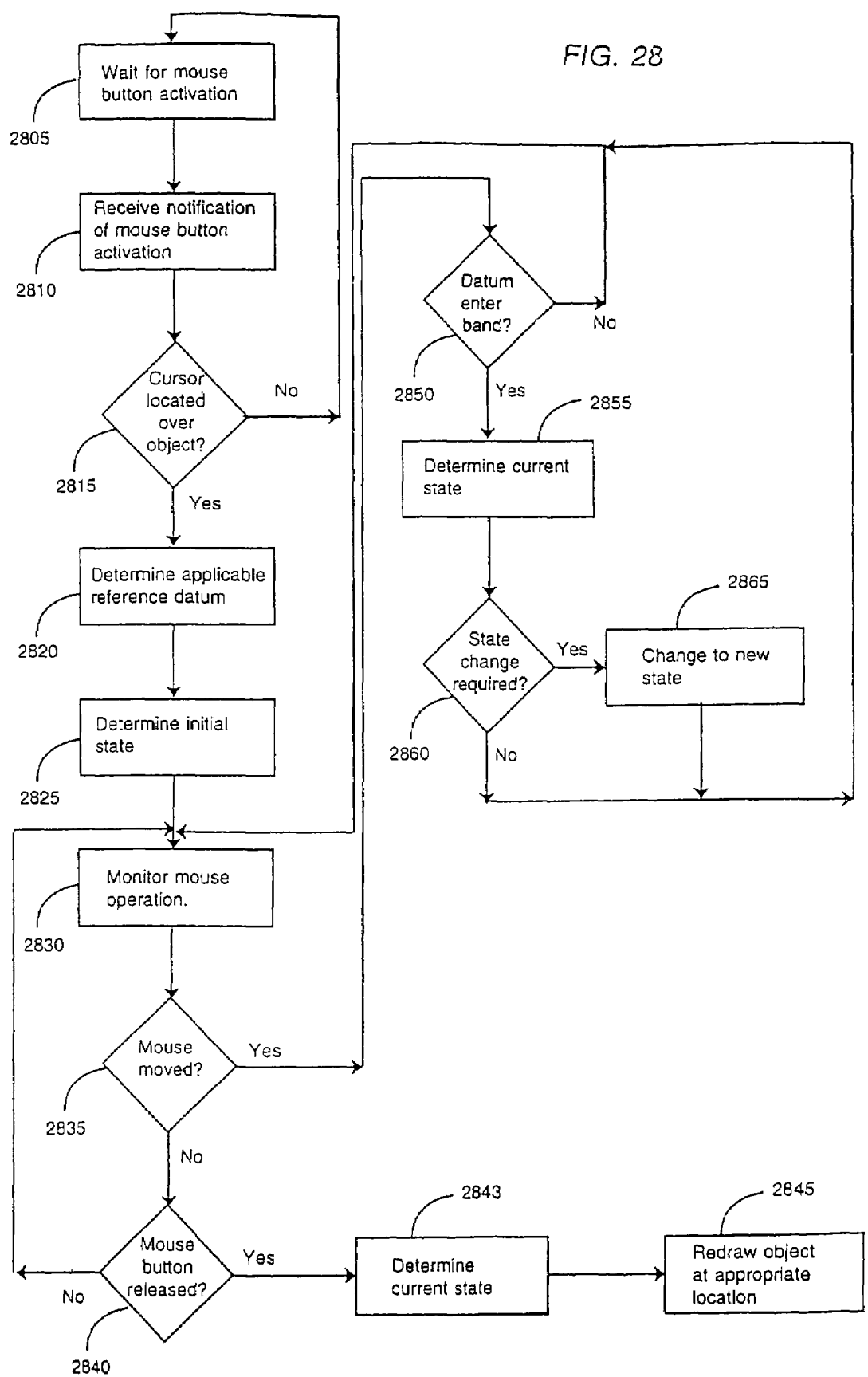
FIG. 28 is a flow chart showing the operation of one embodiment of the invention.

FIG. 28 is a flow chart showing the operation of one embodiment of the invention. As shown in FIG. 28, the activation of a mouse button is awaited at step 2805. When a mouse button is activated, notification of the mouse button activation is received at step 2810. At step 2815, a determination is made as to whether the mouse cursor is positioned over an object (such as, for example, object 2000 of FIG. 20) on a display screen. If it is determined that the cursor is not positioned over an object, processing returns to step 2805.

If it is determined that the cursor is positioned over an object, the identity and location of the applicable reference datum is determined at step 2820. For example, for an object for which no other reference datums other than its external boundaries have been established, in one embodiment, the applicable reference datum will be the object's external boundaries. Alternatively, if the object has other reference datums other than its external boundaries, one or more applicable datums are determined using appropriate criteria. In one embodiment, for example, the reference datum nearest the cursor position when the mouse button is clicked is selected as the applicable datum. A variety of other criteria may also be used.

At step 2825, the initial state of the object at the time the mouse button is clicked is determined. In one embodiment, the initial state is deemed to be state 3 of FIG. 15: namely, the object is not currently stuck to any other object, and the gravity associated with any immediately adjacent object is off. In another embodiment, the initial state of the object is the state of the object that resulted from any immediately prior manipulation of the object. For example, if the object was previously manipulated so as to become stuck to another object (state 2), then the initial state at step 2825 is also state 2. In other embodiments, other criteria may be used to establish the initial state.

At step 2830, further mouse operations are monitored. At step 2835, a determination is made as to whether the mouse has moved. If not, at step 2840, a determination is made as to whether the mouse button has been released. If the mouse button has been released, the current state of the object is determined at step 2843, and the object is redrawn at the appropriate location determined by the position of the cursor and the current state at step 2845. If the mouse button has not been released, processing returns to step 2830.

If a determination is made at step 2835 that the mouse has moved, a determination is made whether any applicable reference datum has entered an applicable band of a multiband region of influence at 2850. Such a determination may be made, for example, by determining whether the a reference datum identified at block 2820 falls in an applicable band. In one embodiment, if the applicable datum comprises the vertical and horizontal edges of the external boundary of a rectangular object, an applicable band is a band related to a vertical side of a stationary object for the vertical portions of the reference datum for an object being moved, and a band related to a horizontal side of a stationary object for the horizontal portions of the datum for the object being moved. If it determined that no reference datum has entered an applicable band, processing returns to step 2830.

If it is determined at step 2850 that a reference datum has entered into an applicable band, then the current state for that band and that datum is determined at block 2855. The current state may, for example, be maintained in a look-up-table listing objects, datums, and states. The current state may, for example, be one of the states of FIG. 15.

At step 2860, a determination is made as to whether the event of the datum entering the band necessitates a change in state. Whether or not a change in state is required depends on the current state and the particular band the datum has entered. For example, in the embodiment of FIG. 19, if the current state is state 1 1500 of FIG. 15, and a vertical datum line of the object being moved has entered band 1910*a*, 1910*b*, 1910*e*, or 1910*f*, for example, no change in state is needed. However, if a vertical datum line of an object in state 1 enters into either of bands 1910*c* or 1910*d*, a change in state is invoked from state 1 to state 2.

If no change in state is required, processing returns to step 2830. If a change in state is required, that change is made and the new state recorded at step 2865. Processing then returns to step 2830.

Figure 29:
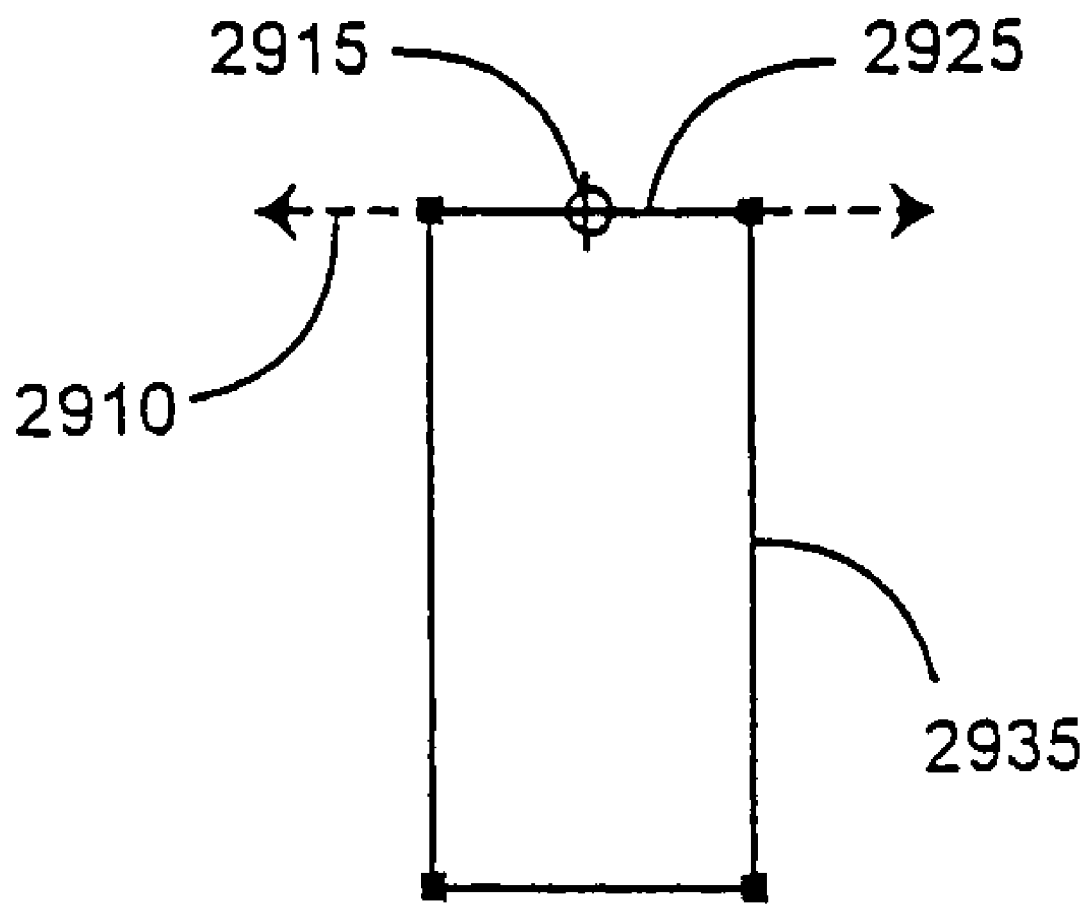
FIG. 29 shows an example of a datum line used with an embodiment of a multiband region of influence of the invention when an object is being resized.

FIG. 29 shows an example of a datum 2910 used with the multiband region of influence of the invention when an object is being resized, as opposed to being moved. To resize an object, a cursor 2915 is used to select an edge (or in some embodiments a resizing "handle") 2925 of the object 2935 being resized. Only the edge 2925, not the entire object 2935, moves when the edge is dragged to a new desired position. Datum line 2910 is located at the mouse cursor position and extends parallel to the edge 2925 that has been selected for resizing. The location of edge 2925 once the mouse button is released during resizing is determined from current state of edge 2925 in relation to a multiband region of influence and the position of the datum line 2910 at the time the mouse button is released in the same manner as the location for the edge of an object being moved is determined as described with respect to FIGS. 19-26. However, in the case of resizing, instead of the object being moved to match the new edge position, the object is stretched (or compressed) to accommodate the new edge position.

Figure 30:
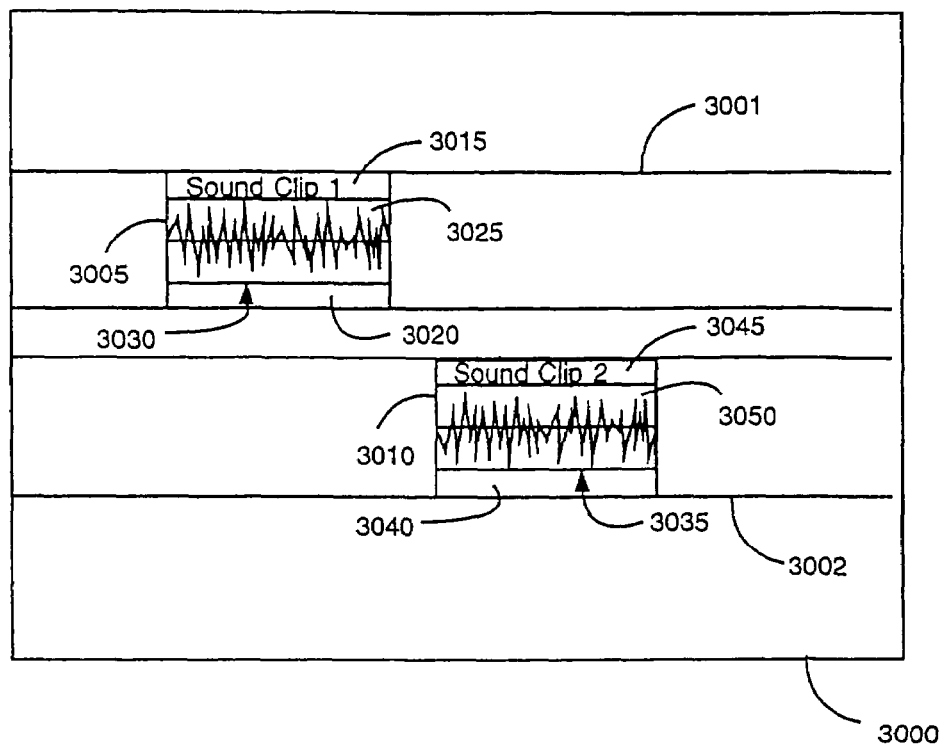
FIG. 30 shows an example of the user interface of a sound editing program that uses an embodiment of the invention.

FIG. 30 shows an example of the user interface of a sound editing program that uses an embodiment of the invention. FIG. 30 shows a display screen 3000 that contains two audio tracks 3001 and 3002. The horizontal axis of display screen 3000 represents time. Audio track 3001 contains a screen object 3005 that represents a first sound clip. Audio track 3002 contains a screen object 3010 that represents a second sound clip. The relative horizontal positions of screen objects 3005 and 3010 represent the points in time during which the sound clips represented by the screen objects play during playback.

Screen object 3005 includes a name area 3015, a wave area 3025, and a sync point area 3020. Screen object 3010 also includes a name area 3045, a wave area 3050, and a sync point area 3040.

Name area 3015 displays the name of the sound clip represented by screen object 3005. Wave area 3025 shows a representation of the sound wave represented by screen object 3005. Sync point area 3020 shows user-created sync points, such as sync point 3030. In one embodiment, a user may create a sync point by clicking in the sync point area of a screen object at the desired horizontal location of the sync point and activating an appropriate pull-down menu command.

In the embodiment of FIG. 30, screen objects 3005 and 3010 may be moved, using a pointing device such as a mouse, horizontally along audio tracks 3001 and 3002, respectively. Screen objects may also be moved from one track to another. In one embodiment, a screen object may be moved by positioning a mouse cursor in either the name area or the sync area, and dragging the object to the desired location. A screen object can be constrained to remain in a track by, for example, holding down a shift key on a keyboard while dragging.

Figure 31:
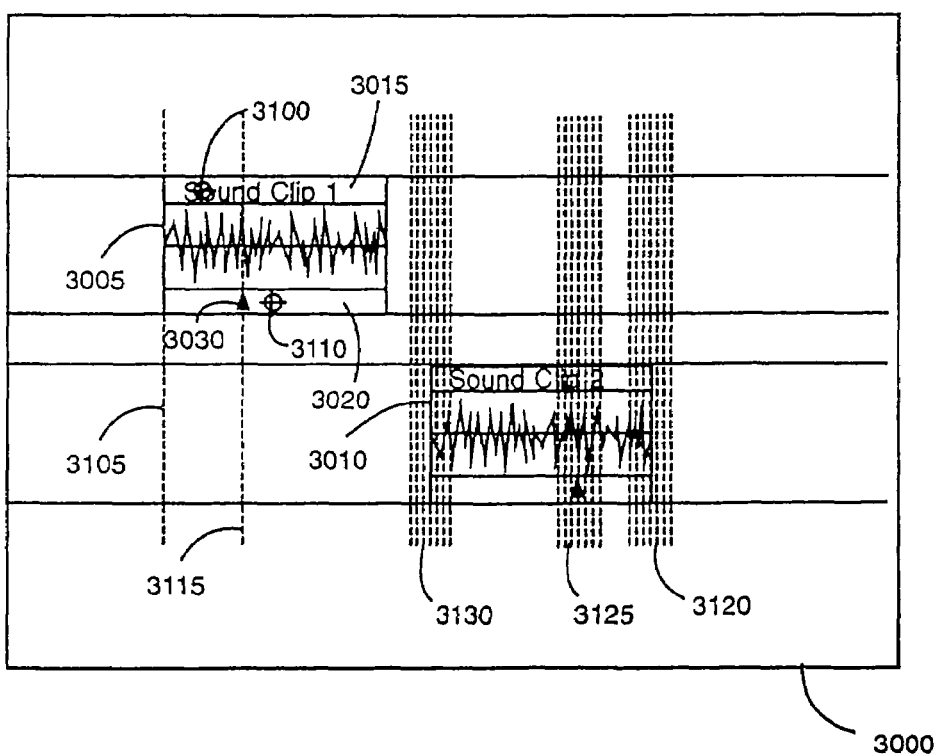
FIG. 31 shows an example of how the reference datum and regions of influence of the invention may be used with the embodiment of FIG. 30.

When a screen object is being moved in the example of FIG. 30, multiband regions of influence are activated with respect to each vertical side and each sync point of the other screen objects displayed on the screen, as shown in FIG. 31. In FIG. 31, screen object 3005 is being moved. Accordingly, multiband regions of influence 3130, 3120, and 3125 are activated with respect to the left and right edges and sync point 3035 of screen object 3010, respectively.

In the embodiments of FIGS. 30 and 31, the applicable reference datum for the screen object being moved is determined by the location of the mouse cursor when the drag operation is begun (i.e. when the mouse button is clicked). In the embodiment of FIGS. 30 and 31, a screen object drag operation can be begun by positioning the cursor in either the name area or the sync point area of the screen object being dragged. If the cursor is positioned in the name area of the screen object at the beginning of a drag operation, the left or right edge of the screen object that is nearest to the cursor position establishes the reference datum applicable to that drag operation. If the cursor is positioned in the sync point area, the nearest sync point establishes the reference datum.

For example, in the embodiment of FIG. 31, if, at the beginning of a drag operation, the cursor is located at position 3100 in name area 3015 of screen object 3005, the nearest left or right edge of screen object 3005 is the left edge. Accordingly, reference datum 3105 is established at the horizontal location of the left edge of screen object 3005. Alternatively, if, at the beginning of a drag operation, the cursor is located at position 3110 in sync point area 3020, the nearest sync point is sync point 3030. Accordingly, reference datum 3115 is established at the horizontal location of sync point 3030. The interaction of reference datums 3105 or 3115 with multiband regions of influence 3130, 3125, and 3120 allows an edge or sync point of one screen object to be precisely aligned with an edge or sync point of another screen object, or to be positioned close to but not precisely aligned with an edge or sync point of the other screen object, as desired by the user, in the same manner as described with respect to the other embodiments of the invention.

Figure 32:
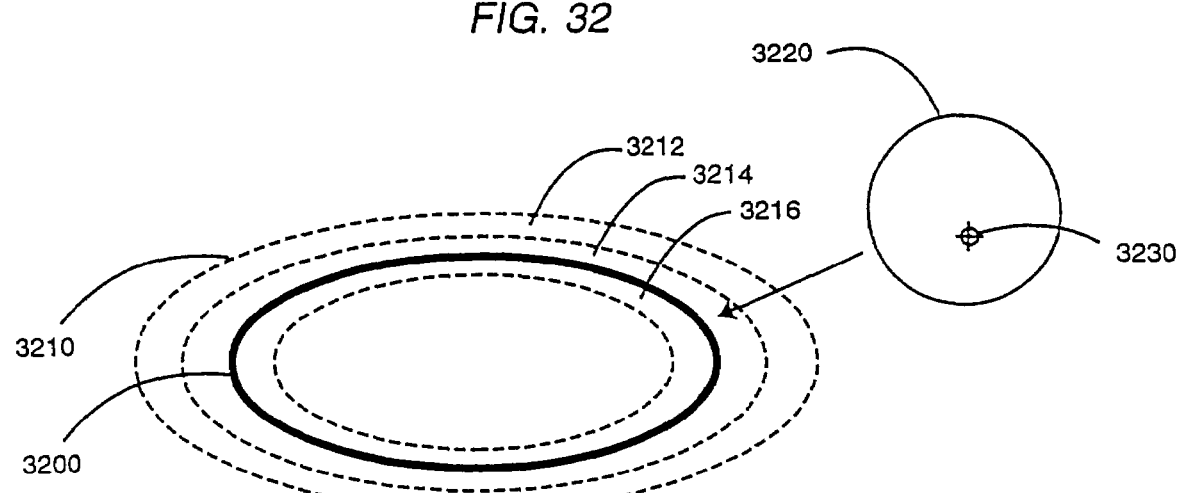
FIG. 32 shows an example of non-rectilinear objects used with an embodiment of the invention.
Figure 33:
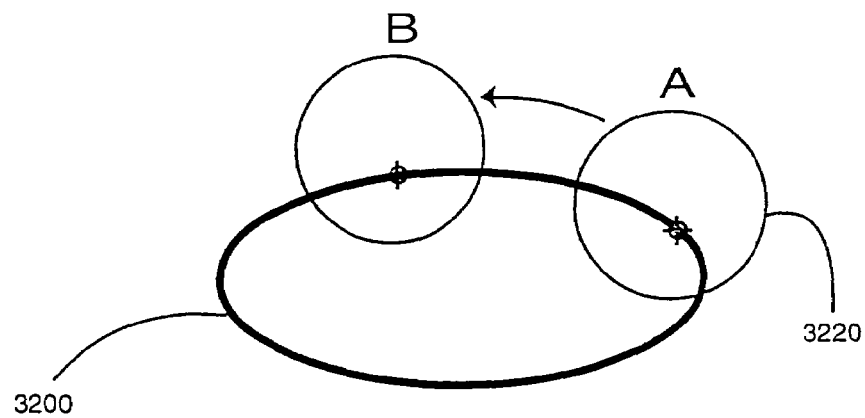
FIG. 33 illustrates the operation of the embodiment of FIG. 32.

FIGS. 32 and 33 show examples of non-rectilinear objects used in one embodiment of the invention. FIG. 32 shows a stationary non-rectilinear object 3200 and a moving non-rectilinear object 3220. In the example of FIG. 32, object 3200 is an oval and object 3220 is a circle. However, objects 3200 and 3220 can have any arbitrary shape. In the example of FIG. 32, stationary object 3200 has an associated multiband region of influence 3210. Moving object 3220 has an associated reference datum 3230, which may, for example, have been designated by a user. Multiband region of influence 3210 comprises bands 3212, 3214 and 3216 which may, for example, have the same functionality as bands 1805, 1810 and 1815, respectively, of the embodiment of FIG. 18. FIG. 32 shows object 3220 being moved towards object 3200, for example by being dragged with a mouse.

According to the invention, if object 3220 is moved such that reference datum 3230 enters band 3214 of multiband region of influence 3210, object 3200's gravity is turned on, and object 3220 is pulled towards object 3200 such that reference datum 3230 of object 3220 coincides with the outside edge (i.e. the periphery) of stationary object 3200. Position "A" in FIG. 33 indicates the resulting relative positions of objects 3200 and 3220. If, for example, a user now drags object 3220 to the left in a generally horizontal direction, object 3220 will remain stuck to object 3200 and move along the periphery of object 3200 (e.g. from position "A" to position "B") as long as the conditions for object 3220 being "stuck" to object 3200 (e.g. reference datum 3230 remains in band 3214 of multiband region of influence 3210) continue to be met. However, as in the embodiment of FIG. 18, if object 3220 is moved such that reference datum 3230 enters band 3216, object 3200's gravity is turned off, and object 3220 becomes unstuck from object 3200.

Thus, a method and apparatus for manipulating screen objects has been described. Although the invention has been described with respect to certain example embodiments, it will be apparent to those skilled in the art that the present invention is not limited to these specific embodiments. For example, although the multiband region of influence has been described with respect to two-dimensional, rectangular screen objects, the multiband region of influence of the invention can be used with three dimensional screen objects and with objects of any shape. Further, although the operation of certain embodiments has been described in detail using certain detailed process steps, some of the steps may be omitted or other similar steps may be substituted without departing from the scope of the invention. Other embodiments incorporating the inventive features of the invention will be apparent to those skilled in the art.

The invention claimed is:

1. A method for manipulating screen objects on a display screen comprising:

providing a first screen object with a plurality of regions of influence, wherein said plurality of regions of influence comprises a plurality of overlapping screen areas;

providing a first functionality associating said first screen object and a second screen object, wherein said first functionality comprises functionality for automatically aligning said first screen object and said second screen object, said first screen object being a first audio signal graphical representation and said second screen object being a second audio signal graphical representation;

invoking a first action on said first functionality when said second screen object is moved to within a first region of influence of said plurality of regions of influence;

invoking a second action on said first functionality when said second screen object is moved from said first region of influence to a second region of influence; and invoking a third action on said first functionality when said second screen object is moved from within said second region of influence to within said first region of influence.

2. The method of claim 1, wherein said first screen object further comprises an icon image representation of a first computer file.

3. The method of claim 1, wherein said a plurality of regions of influence comprises a plurality of concentric bands of screen areas.

4. The method of claim 1, wherein said plurality of regions of influence comprises a plurality of juxtaposed screen areas.

5. The method of claim 1, wherein said plurality of regions of influence comprises a plurality of reference data and a plurality of screen locations.

6. The method of claim 5, wherein said plurality of screen locations further comprise at least one pixel.

7. The method of claim 6, wherein said plurality of screen locations further comprise a line.

8. The method of claim 1, wherein invoking said first action on said first functionality comprises activating said first functionality to associate said first screen object with said second first screen object.

9. The method of claim 8, further comprising invoking said first functionality when said second object is moved within said first region of influence after said invoking of said first action.

10. The method of claim 1, wherein invoking said second action on said first functionality comprises deactivating said first functionality.

11. The method of claim 10, wherein invoking said second action on said first functionality further comprises activating a second functionality to associate said first screen object with said second first screen object.

12. The method of claim 11, wherein activating said second functionality comprises invoking said second functionality when said second screen object is moved within said second region of influence.

13. The method of claim 12, wherein invoking said third action comprises deactivating said second functionality.

14. The method of claim 12, wherein invoking said third action on said first functionality comprises reactivating said first functionality.

15. A computer program product embodied in a tangible computer readable medium, and comprising computer instructions for:
   providing a first screen object with a plurality of regions of influence, wherein said plurality of regions of influence comprises a plurality of overlapping screen areas;
   providing a first functionality associating said first screen object and a second screen object, wherein said first functionality comprises functionality for automatically aligning said first screen object and said second screen object, said first screen object being a first audio signal graphical representation and said second screen object being a second audio signal graphical representation;
   invoking a first action on said first functionality when said second screen object is moved to within a first region of influence of said plurality of regions of influence;
   invoking a second action on said first functionality when said second screen object is moved from said first region of influence to a second region of influence; and
   invoking a third action on said first functionality when said second screen object is moved from within said second region of influence to within said first region of influence.

* * * * *